United States Patent
Cason

(10) Patent No.: US 10,949,312 B2
(45) Date of Patent: Mar. 16, 2021

(54) LOGGING AND UPDATE OF METADATA IN A LOG-STRUCTURED FILE SYSTEM FOR STORAGE NODE RECOVERY AND RESTART

(71) Applicant: NetApp, Inc., Sunnyvale, CA (US)

(72) Inventor: Christopher Cason, Boulder, CO (US)

(73) Assignee: NetApp, Inc., Sunnyvale, CA (US)

(*) Notice: Subject to any disclaimer, the term of this patent is extended or adjusted under 35 U.S.C. 154(b) by 224 days.

(21) Appl. No.: 16/394,642

(22) Filed: Apr. 25, 2019

(65) Prior Publication Data

US 2020/0097374 A1 Mar. 26, 2020

Related U.S. Application Data

(60) Provisional application No. 62/735,012, filed on Sep. 21, 2018.

(51) Int. Cl.
*G06F 11/00* (2006.01)
*G06F 11/14* (2006.01)
(Continued)

(52) U.S. Cl.
CPC ...... *G06F 11/1471* (2013.01); *G06F 11/1469* (2013.01); *G06F 12/0253* (2013.01);
(Continued)

(58) Field of Classification Search
CPC ............ G06F 11/1402; G06F 11/1415; G06F 11/1446; G06F 11/1448; G06F 11/1458;
(Continued)

(56) References Cited

U.S. PATENT DOCUMENTS 8,316,064 B2 11/2012 Hsu
8,589,640 B2 11/2013 Colgrove et al.
(Continued)

FOREIGN PATENT DOCUMENTS

WO WO-2011090500 A1 7/2011

OTHER PUBLICATIONS

Debnath, Biplob et al., Flashstore: High Throughput Persistent Key-Value Store, 2010, VLDB Endowment (Year: 2010).*
(Continued)

*Primary Examiner* — Marc Duncan
(74) *Attorney, Agent, or Firm* — Jaffery Watson Mendonsa & Hamilton LLP

(57) ABSTRACT

A technique is configured to log and update metadata in a log-structured file system to facilitate recovery and restart in response to failure of a storage node of a cluster. A block identifier (ID) is used to identify a block of data serviced by the storage node. Metadata embodied as mappings between block IDs and locations of data blocks in the cluster are illustratively maintained in "active" and "frozen" map fragments. An active map fragment refers to a map fragment that has space available to store a mapping, whereas a frozen map fragment refers to a map fragment that no available space for storing a mapping. The active map fragments are maintained in memory as "in-core" data structures, whereas the frozen map fragments are paged-out and stored on storage devices of the cluster as "on-disk" map fragment structures. Each frozen map fragment written to a segment includes a pointer to a last written frozen map fragment to form a chain (e.g., linked-list) of on-disk frozen map fragments. Each time a data block is persisted on a segment of the storage devices, an active map fragment is populated in-core and a metadata write marker is recorded on the segment (on-disk) indicating the location of the data block
(Continued)

US 10,949,312 B2

Page 2 that was written to the segment. If a storage node crashes when the active map fragment is only partially populated, the metadata write markers facilitate rebuild of the active map fragment upon recovery and restart of a storage service of the node.

20 Claims, 11 Drawing Sheets

(51) Int. Cl.
*G06F 16/18* (2019.01)
*G06F 12/02* (2006.01)
*G06F 12/06* (2006.01)

(52) U.S. Cl.
CPC ...... *G06F 12/0646* (2013.01); *G06F 16/1805* (2019.01); *G06F 2201/82* (2013.01); *G06F 2212/1044* (2013.01)

(58) Field of Classification Search
CPC ............. G06F 11/1464; G06F 11/1469; G06F 11/1471; G06F 12/0253; G06F 12/0646; G06F 16/1805
See application file for complete search history.

(56) References Cited

U.S. PATENT DOCUMENTS

| 8,732,403 | B1 | 5/2014 | Nayak |
| 9,110,839 | B2 | 8/2015 | Strzelczak |
| 9,235,475 | B1 | 1/2016 | Shilane et al. |
| 9,317,218 | B1 | 4/2016 | Botelho et al. |
| 9,383,933 | B2 | 7/2016 | Wright |
| 9,436,596 | B2 | 9/2016 | Sengupta et al. |
| 9,514,146 | B1 | 12/2016 | Wallace et al. |
| 9,798,793 | B1 | 10/2017 | Visvanathan et al. |
| 10,078,583 | B1 | 9/2018 | Wallace |
| 10,452,271 | B2* | 10/2019 | Cowling ............... G06F 3/0641 |
| 10,620,862 | B2* | 4/2020 | Jain ....................... G06F 3/0608 |
| 2009/0249001 | A1 | 10/2009 | Narayanan et al. |
| 2012/0124282 | A1 | 5/2012 | Frank et al. |
| 2014/0115182 | A1 | 4/2014 | Sabaa et al. |
| 2016/0070618 | A1 | 3/2016 | Pundir et al. |
| 2016/0162508 | A1 | 6/2016 | Brosch |
| 2017/0131934 | A1 | 5/2017 | Kaczmarczyk et al. |
| 2018/0181338 | A1 | 6/2018 | Tamura |
| 2018/0253254 | A1 | 9/2018 | Jain et al. |
| 2020/0097404 | A1* | 3/2020 | Cason ................. G06F 12/0246 |

OTHER PUBLICATIONS

PCT Notification of Transmittal of the International Search Report and the Written Opinion of the International Searching Authority, or the Declaration, International Searching Authority, International Application No. PCT/US2019/052061, dated Dec. 17, 2019, 14 pages.
PCT Notification of Transmittal of the International Search Report and the Written Opinion of the International Searching Authority, or the Declaration, International Searching Authority, International Application No. PCT/US2019/052065, dated Dec. 9, 2019, 17 pages.

* cited by examiner

LOGGING AND UPDATE OF METADATA IN A LOG-STRUCTURED FILE SYSTEM FOR STORAGE NODE RECOVERY AND RESTART

CROSS-REFERENCE TO RELATED APPLICATIONS

The present application claims the benefit of U.S. Provisional Patent Application Ser. No. 62/735,012, which was filed on Sep. 21, 2018, by Christopher Lee Cason for EFFICIENT MEMORY FOOTPRINT IN DEDUPLICATED SYSTEM STORING WITH CONTENT BASED ADDRESSING, and is related to U.S. patent application Ser. No. 16/394,357, filed Apr. 25, 2019 by Christopher Cason for EFFICIENT MEMORY FOOTPRINT IN DEDUPLICATED SYSTEM STORING WITH CONTENT BASED ADDRESSING which are hereby incorporated by reference.

BACKGROUND

Technical Field

The present disclosure relates to storage nodes of a cluster and, more specifically, to logging updates and metadata in a log-structured file system for efficient recovery of a storage node.

Background Information

A plurality of storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices. In order to achieve satisfactory performance, it is common for the storage nodes that serve the data provided by the distributed storage architecture to maintain metadata in a main memory of each storage node. For example, the metadata may include information relating to a layout and mapping of a storage device. The amount of metadata that is stored in memory typically is proportional to the size (storage capacity) of the storage devices of the cluster. As the storage capacities of these storage devices increase, the amount of memory (i.e., memory footprint) each storage node requires to provide fast and efficient storage service increases to the point that it may be impractical or costly to store the required metadata in the memory. This is exacerbated when considering recovery and restart of the storage service in response to failure of a storage node such that any technique that offloads metadata memory usage must also contemplate an effective manner of recovery and restart.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
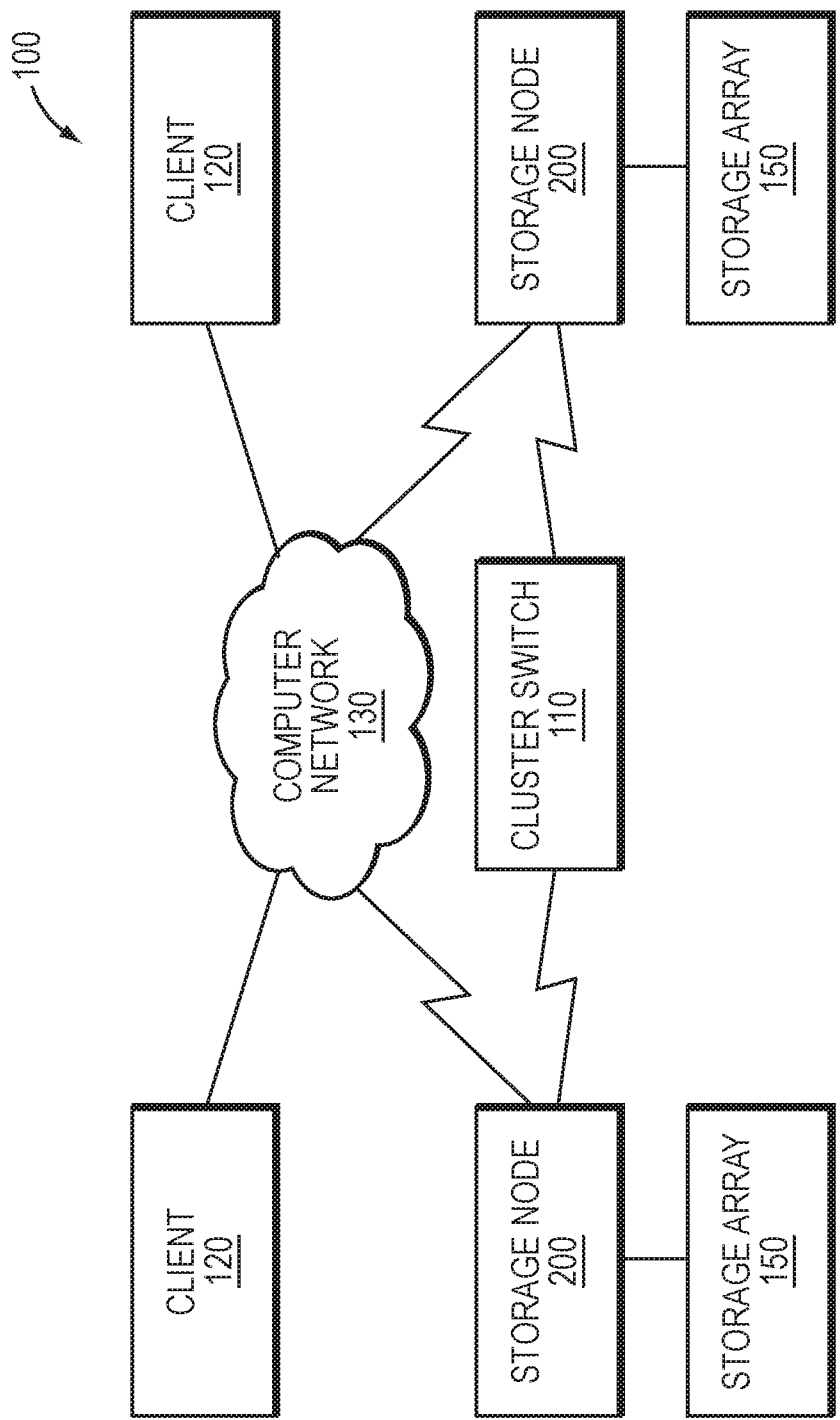
FIG. 1 is a block diagram of a plurality of storage nodes interconnected as a storage cluster.

The embodiments described herein are directed to a technique configured to log and update metadata in a log-structured file system to facilitate recovery and restart in response to failure of a storage node of a cluster. Illustratively, a block identifier (ID) is used to identify a block of data serviced by the storage node. Metadata embodied as mappings between block IDs and locations of data blocks in the cluster are illustratively maintained in map fragments (i.e., as mapping entries). A map fragment may be embodied as "active" map fragment or a "frozen" map fragment. An active map fragment refers to a map fragment that has space (i.e., unused mapping entries) available to store a mapping, whereas a frozen map fragment refers to a map fragment that is full, i.e., has no available space for storing a mapping. In order to reduce memory footprint usage of each storage node, yet still provide fast and efficient servicing of data by the node, the active map fragments are preferably maintained in memory as "in-core" data structures, whereas the frozen map fragments are "paged out" and stored on storage devices of the cluster as "on-disk" map fragment structures. The in-core and on-disk map fragments may be tracked using one or more filters, e.g., Bloom filters, such that a block of data may be located by its block ID using the Bloom filter to obtain the map fragment that has the location of the block of data on-disk. In this manner, at least two stages of metadata may be used to obtain actual data blocks: (1) Bloom filters that describe locations of the map fragments; and (2) the map fragments having mappings of block IDs to storage locations for the blocks of data.

According to the technique, the log-structured file system (LSFS) is disposed over the storage devices, i.e., block service drives (BSDs), to enable writing of data (and metadata) blocks as logical chunks or "segments" on each drive. The segments are illustratively sized up to, e.g., 1 MB for block services (BS) and 4 MB for volume services (VS) of the cluster, and contained within fixed sized segment files of the BSD to facilitate indexing among the segments of a file. Each new frozen map fragment written to a segment includes a pointer to (i.e., referencing) a last written frozen map fragment to form a chain (e.g., linked-list) of on-disk frozen map fragments. In addition, each time a data block is persisted (written) on a segment of the BSD, an active map fragment is populated in-core and a metadata write marker is recorded on the segment (on-disk) indicating the location of the data block that was written to the BS segment. If a storage node crashes when the active map fragment is only partially populated, the metadata write markers facilitate rebuild of the active map fragment upon recovery and restart of a storage service of the node.

In an embodiment, a storage service implemented in each storage node of the cluster includes one or more volume services configured to process and store the LBA to block ID mappings, as well as one or more block services configured to process and store the blocks of data, e.g., on the BSDs of a storage array. The data is divided into data blocks, and each data block is hashed to generate a hash value recorded as a block identifier (ID) of the respective data block; illustratively, the block ID is used to locate the data on one or more BSDs of the storage array. The data is illustratively organized within bins that are maintained by a block service for storage on the BSDs. A bin may be derived from the block ID for storage of a corresponding data block by extracting a predefined number of bits from the block ID.

Illustratively, the bin may be divided into buckets or "sublists" by extending the predefined number of bits extracted from the block ID. For example, a bin field of the block ID may contain the first two bytes (2 B) of the block ID used to generate a bin number between 0 and 65,535 (depending on the number of 16-bits used) that identifies a bin. A sublist field may then contain the next byte (1 B) of the block ID used to generate a sublist identifier between 0 and 255 (depending on the number of 8-bits used) that identifies a sublist within the bin. Dividing the bin into sublists facilitates, inter alia, network transfer (or syncing) of data among block services in the event of a failure or crash of a storage node. Each block service maintains a mapping between a block ID and a location of the data block on its associated BSD. Mappings between block IDs and locations of data blocks on BSDs are illustratively maintained in the map fragments as mapping entries, such that each map fragment includes a portion of the mappings between block IDs and the locations of the data blocks on the BSD. The number of bits used within the sublist field to generate the sublist identifier may be set so that each sublist includes one or more map fragments that map a predetermined amount of data blocks, e.g., approximately 4 MB of data blocks.

When a block ID is generated for a data block destined for storage on a BSD, the block service examines the sublist field of the block ID to determine the sublist associated with the data block. The block ID is then loaded into an active map fragment (i.e., into an unused mapping entry) for that sublist as part of a mapping that includes the storage location of the data block on the BSD. As the active map fragment is populated, one or more Bloom filters is generated that identifies all the data blocks stored on the BSD that are mapped by the map fragment. Upon being fully populated, the active map fragment transitions to a frozen map fragment that is stored (persisted) on the BSD as metadata embodied as an on-disk map fragment structure. As part of the transition, additional metadata embodied as a map fragment filter (MFF) of the generated Bloom filters for the map fragment is created that includes a location (e.g., pointer) referencing the frozen map fragment structure to be stored on the BSD. The block service then writes (pages-out) the frozen map fragment and MFF to the BSD, wherein the MFF includes the Bloom filter and pointer to the on-disk location (i.e., BSD address) of the frozen map fragment. Notably, a sublist may be associated with more than one map fragment and corresponding MFF.

As more data is serviced by the storage nodes, more data blocks are generated which, in turn, require generation of more metadata, i.e., map fragments for each sublist. Eventually, each sublist may reach a point where the map fragments may exceed the desired mapping of the predetermined amount (e.g., 4 MB) of data blocks. Exceeding the predetermined amount of data blocks per sublist may increase the need for additional Bloom filters, e.g., in the form of multiple levels of Bloom filters, that may result in increasingly high false positive rates for the Bloom filters. Accordingly, another bit of the sublist field may be allocated to limit the mapping of the sublist (and associated map fragments) to no more than the predetermined amount of data blocks. For example, the number of bits used in the sublist field may increase from 2 to 3 bits (i.e., from 4 sublists to 8 sublists), resulting in 4 new sublists per bin. Block IDs of data blocks for new write requests may be written to the new sublists, whereas block IDs of data blocks stored in previously written sublists may be maintained and eventually combined with the new sublists based on shared predefined bits, e.g., least significant bits (LSBs), of the sublist field. That is, block IDs of data blocks maintained in previous sublists identified by 2 bits (e.g., 00) may be eventually combined with new sublists identified by 3 bits (e.g., 000 and/or 100) based on the shared LSBs (e.g., 00). A "history" of the previously written map fragments persisted on-disk may be maintained for a period of time (e.g., until garbage collected and/or re-cycled) in accordance with the LSFS disposed over the BSDs, thereby obviating the need to rehash to increase the number of sublists by re-writing the previously persisted map fragments.

Description

Storage Cluster

FIG. 1 is a block diagram of a plurality of storage nodes 200 interconnected as a storage cluster 100 and configured to provide storage service for information, i.e., data and metadata, organized and stored on storage devices of the cluster. The storage nodes 200 may be interconnected by a cluster switch 110 and include functional components that cooperate to provide a distributed, scale-out storage architecture of the cluster 100. The components of each storage node 200 include hardware and software functionality that enable the node to connect to and service one or more clients 120 over a computer network 130, as well as to a storage array 150 of storage devices, to thereby render the storage service in accordance with the distributed storage architecture.

Each client 120 may be embodied as a general-purpose computer configured to interact with the storage node 200 in accordance with a client/server model of information delivery. That is, the client 120 may request the services of the node 200, and the node may return the results of the services requested by the client, by exchanging packets over the network 130. The client may issue packets including file-based access protocols, such as the Network File System (NFS) and Common Internet File System (CIFS) protocols over the Transmission Control Protocol/Internet Protocol (TCP/IP), when accessing information on the storage node in the form of storage objects, such as files and directories. However, in an embodiment, the client 120 illustratively issues packets including block-based access protocols, such as the Small Computer Systems Interface (SCSI) protocol encapsulated over TCP (iSCSI) and SCSI encapsulated over FC (FCP), when accessing information in the form of storage objects such as logical units (LUNs).

Figure 2:
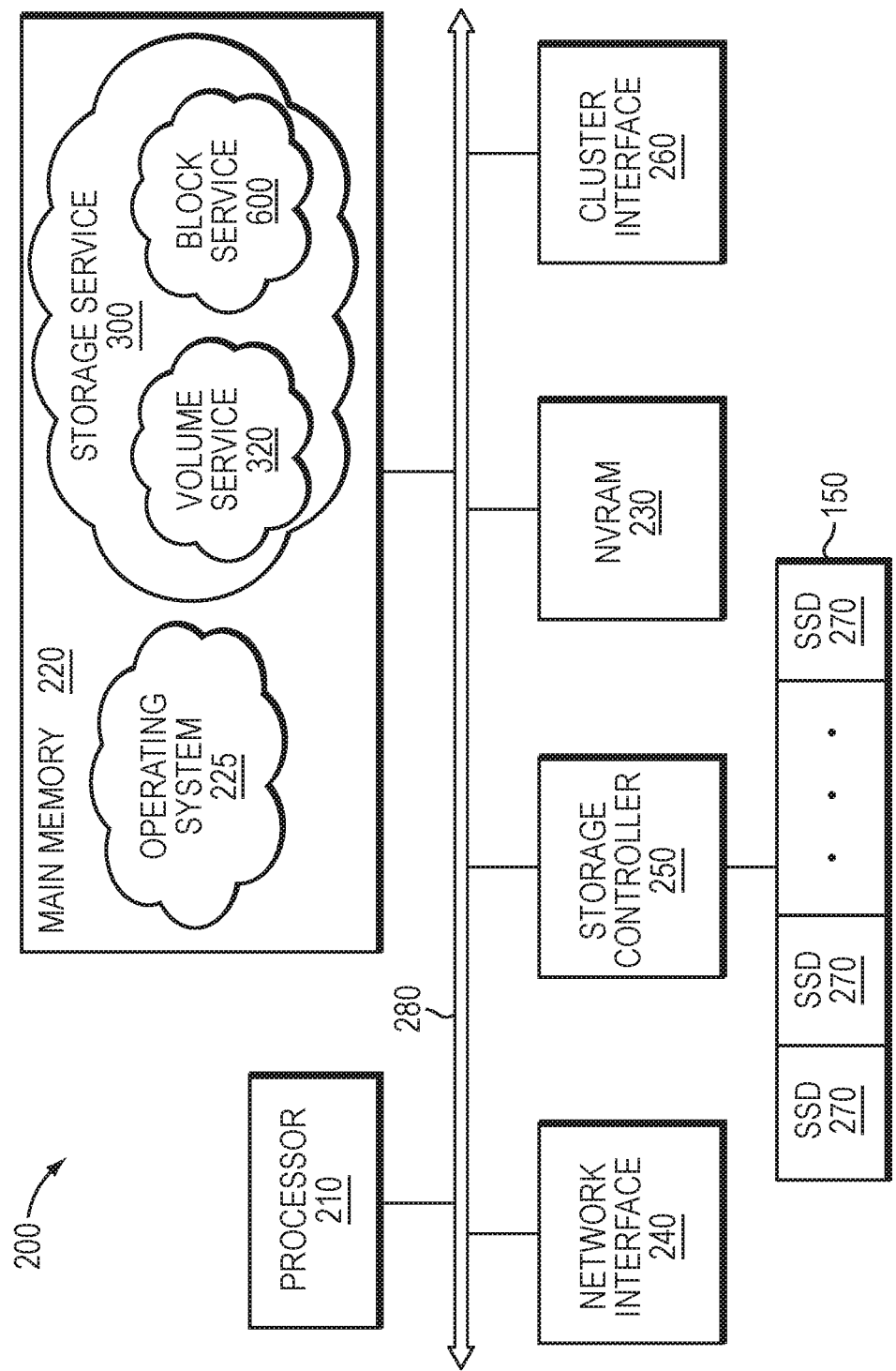
FIG. 2 is a block diagram of a storage node.

FIG. 2 is a block diagram of storage node 200 illustratively embodied as a computer system having one or more processing units (processors) 210, a main memory 220, a non-volatile random access memory (NVRAM) 230, a network interface 240, one or more storage controllers 250 and a cluster interface 260 interconnected by a system bus 280. The network interface 240 may include one or more ports adapted to couple the storage node 200 to the client(s) 120 over computer network 130, which may include point-to-point links, wide area networks, virtual private networks implemented over a public network (Internet) or a shared local area network. The network interface 240 thus includes the mechanical, electrical and signaling circuitry needed to connect the storage node to the network 130, which may embody an Ethernet or Fibre Channel (FC) network.

The main memory 220 may include memory locations that are addressable by the processor 210 for storing software programs and data structures associated with the embodiments described herein. The processor 210 may, in turn, include processing elements and/or logic circuitry configured to execute the software programs, such as volume service 320 and block service 600 of storage service 300, and manipulate the data structures. An operating system 225, portions of which are typically resident in memory 220 (in-core) and executed by the processing elements (e.g., processor 210), functionally organizes the storage node by, inter alia, invoking operations in support of the storage service 300 implemented by the node. A suitable operating system 225 may include a general-purpose operating system, such as the UNIX® series or Microsoft Windows® series of operating systems, or an operating system with configurable functionality such as microkernels and embedded kernels. However, in an embodiment described herein, the operating system is illustratively the Linux® operating system. It will be apparent to those skilled in the art that other processing and memory means, including various computer readable media, may be used to store and execute program instructions pertaining to the embodiments herein.

The storage controller 250 cooperates with the storage service 300 implemented on the storage node 200 to access information requested by the client 120. The information is preferably stored on storage devices such as solid state drives (SSDs) 270, illustratively embodied as flash storage devices, of storage array 150. In an embodiment, the flash storage devices may be block-oriented devices (i.e., drives accessed as blocks) based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. The storage controller 250 may include one or more ports having I/O interface circuitry that couples to the SSDs 270 over an I/O interconnect arrangement, such as a conventional serial attached SCSI (SAS) and serial ATA (SATA) topology.

The cluster interface 260 may include one or more ports adapted to couple the storage node 200 to the other node(s) of the cluster 100. In an embodiment, dual 10 Gbps Ethernet ports may be used for internode communication, although it will be apparent to those skilled in the art that other types of protocols and interconnects may be utilized within the embodiments described herein. The NVRAM 230 may include a back-up battery or other built-in last-state retention capability (e.g., non-volatile semiconductor memory such as storage class memory) that is capable of maintaining data in light of a failure to the storage node and cluster environment.

Storage Service

Figure 3:
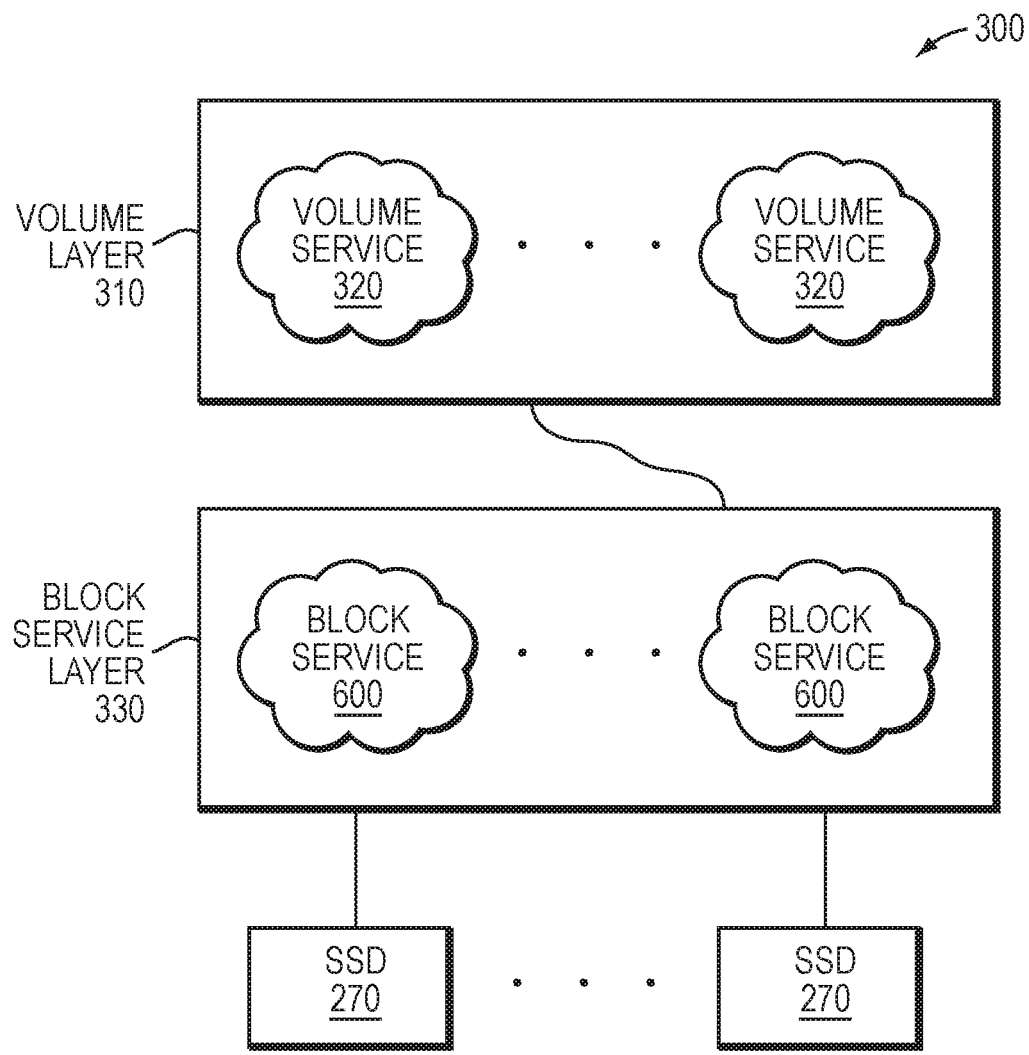
FIG. 3 is a block diagram of a storage service of the storage node.

FIG. 3 is a block diagram of the storage service 300 implemented by each storage node 200 of the storage cluster 100. The storage service 300 is illustratively organized as one or more software modules or layers that cooperate with other functional components of the nodes 200 to provide the distributed storage architecture of the cluster 100. In an embodiment, the distributed storage architecture aggregates and virtualizes the components (e.g., network, memory, and compute resources) to present an abstraction of a single storage system having a large pool of storage, i.e., all storage arrays 150 of the nodes 200 for the entire cluster 100. In other words, the architecture consolidates storage, i.e., the SSDs 270 of the arrays 150, throughout the cluster to enable storage of the LUNs, which are apportioned into logical volumes ("volumes") having a logical block size of either 4096 bytes (4 KB) or 512 bytes. The volumes are further configured with properties such as size (storage capacity) and performance settings (quality of service), as well as access control, and are thereafter accessible as a block storage pool to the clients, preferably via iSCSI and/or FCP. Both storage capacity and performance may then be subsequently "scaled out" by growing (adding) network, memory and compute resources of the nodes 200 to the cluster 100.

Each client 120 may issue packets as input/output (I/O) requests, i.e., storage requests, to a storage node 200, wherein a storage request may include data for storage on the node (i.e., a write request) or data for retrieval from the node (i.e., a read request), as well as client addressing in the form of a logical block address (LBA) or index into a volume based on the logical block size of the volume and a length. The client addressing may be embodied as metadata, which is separated from data within the distributed storage architecture, such that each node in the cluster may store the metadata and data on different storage devices (SSDs 270) of the storage array 150 coupled to the node. To that end, the storage service 300 implemented in each node 200 includes a volume layer 310 having one or more volume services 320 configured to process and store the LBA to block ID mappings, and a block server layer 330 having one or more block services 600 configured to process and store the data, e.g., on the SSDs 270. Illustratively, the volume service 320 maps between client addressing (e.g., LBA indexes) used by the clients to access the data on a volume and block addressing (e.g., block identifiers) used by the block services 600 to store the data on the volume, e.g., of the SSDs.

Figure 4:
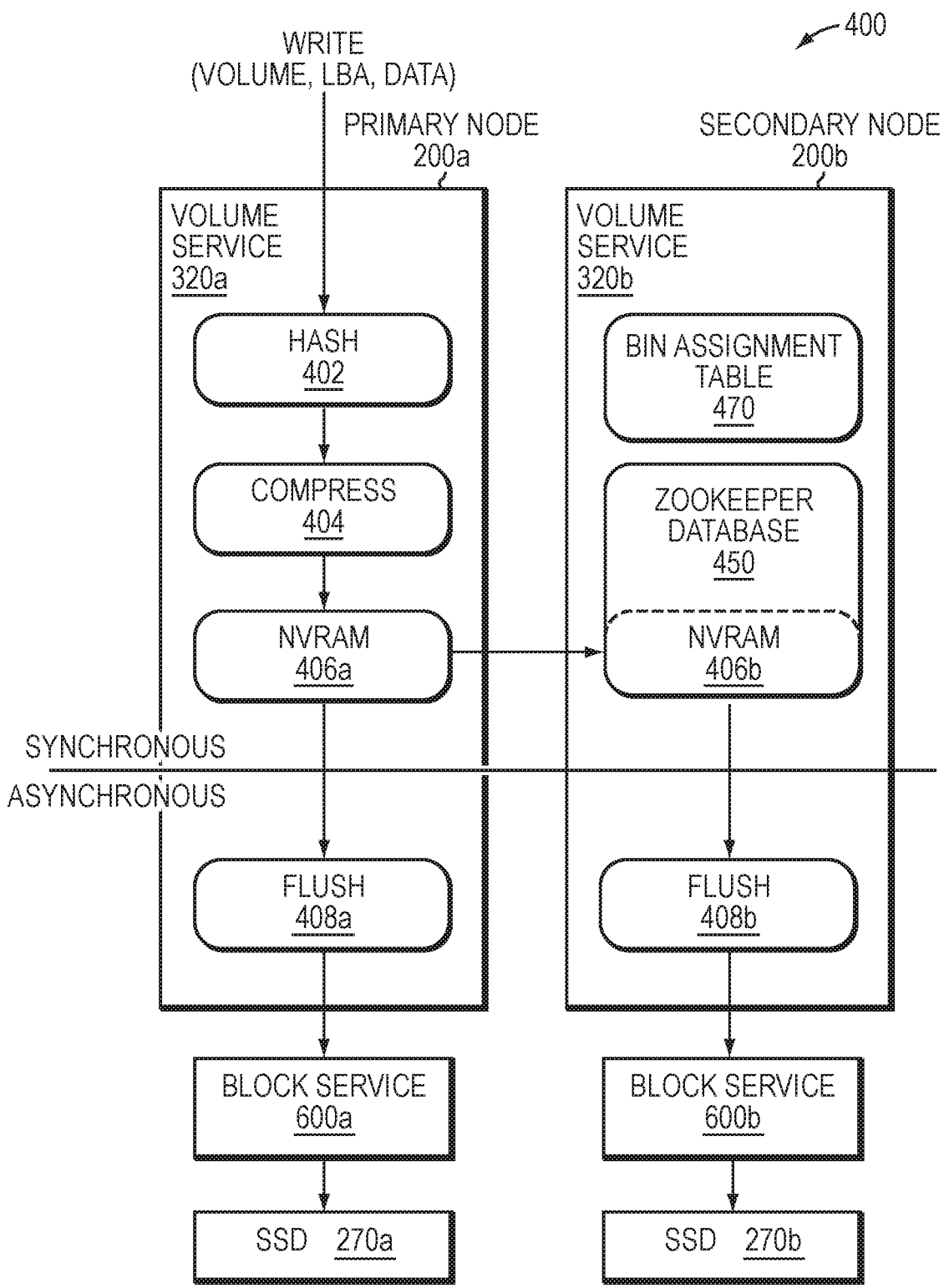
FIG. 4 illustrates a write path of the storage node.

FIG. 4 illustrates a write path 400 of a storage node 200 for storing data on a volume of a storage array 150. In an embodiment, an exemplary write request issued by a client 120 and received at a storage node 200 (e.g., primary node 200a) of the cluster 100 may have the following form:

write(volume,LBA,data)

wherein the volume specifies the logical volume to be written, the LBA is the logical block address to be written, and the data is logical block size of the data to be written. Illustratively, the data received by a volume service 320a of the storage node 200a is divided into 4 KB block sizes. At box 402, each 4 KB data block is hashed using a conventional cryptographic hash function to generate a 128-bit (16 B) hash value (recorded as a block identifier (ID) of the data block); illustratively, the block ID is used to address (locate) the data on the storage array 150. A block ID is thus an identifier of a data block that is generated based on the content of the data block. The conventional cryptographic hash function, e.g., Skein algorithm, provides a satisfactory random distribution of bits within the 16B hash value/block ID employed by the technique. At box 404, the data block is compressed using a conventional, e.g., LZW (Lempel-Zif-Welch), compression algorithm and, at box 406a, the compressed data block is stored in NVRAM 230. Note that, in an embodiment, the NVRAM 230 is embodied as a write cache. Each compressed data block is then synchronously replicated to the NVRAM 230 of one or more additional storage nodes (e.g., secondary storage node 200b) in the cluster 100 for data protection (box 406b). An acknowledgement is returned to the client when the data block has been safely and persistently stored in the NVRAM 230 of the multiple storage nodes 200 of the cluster 100.

Figure 5:
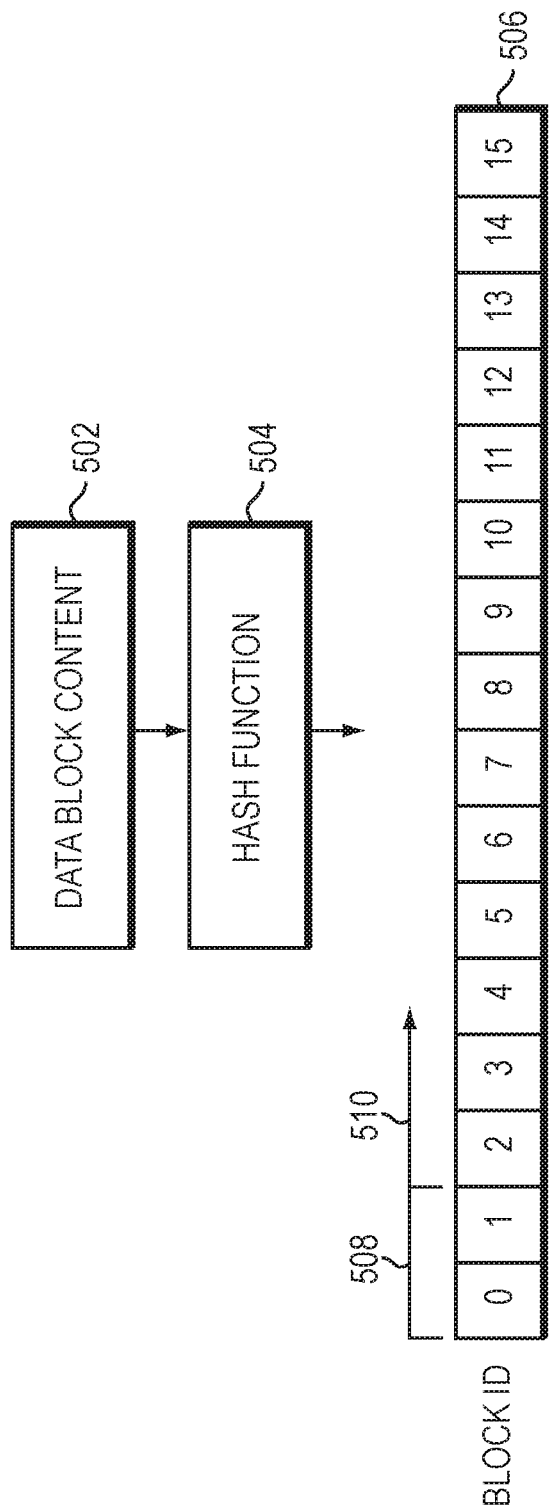
FIG. 5 is a block diagram illustrating details of a block identifier.

FIG. 5 is a block diagram illustrating details of a block identifier. In an embodiment, content 502 for a data block is received by storage service 300. As described above, the received data is divided into data blocks having content 502 that may be processed using hash function 504 to determine block identifiers (IDs) 506. That is, the data is divided into 4 KB data blocks, and each data block is hashed to generate a 16B hash value recorded as a block ID 506 of the data block; illustratively, the block ID 506 is used to locate the data on one or more storage devices 270 of the storage array 150. The data is illustratively organized within bins that are maintained by a block service 600 for storage on the storage devices. A bin may be derived from the block ID for storage of a corresponding data block by extracting a predefined number of bits from the block ID 506.

According to the technique, the bin may be divided into buckets or "sublists" by extending the predefined number of bits extracted from the block ID. For example, a bin field 508 of the block ID may contain the first two (e.g., most significant) bytes (2 B) of the block ID 506 used to generate a bin number (identifier) between 0 and 65,535 (depending on the number of 16-bits used) that identifies a bin. The bin identifier may also be used to identify a particular block service 600 and associated SSD 270. A sublist field 510 may then contain the next byte (1 B) of the block ID used to generate a sublist identifier between 0 and 255 (depending on the number of 8-bits used) that identifies a sublist with the bin. Dividing the bin into sublists facilitates, inter alia, network transfer (or syncing) of data among block services in the event of a failure or crash of a storage node. The number of bits used for the sublist identifier may be set to an initial value, and then adjusted later as desired. Each block service 600 maintains a mapping between the block ID and a location of the data block on its associated storage device/SSD, i.e., block service drive (BSD). Mappings between block IDs and locations of data blocks on BSDs are illustratively maintained in map fragments, such that each map fragment includes a portion of the mappings between block IDs and the locations of the data blocks on the BSD. The number of bits used within the sublist field 510 to generate the sublist identifier may be set so that each sublist includes one or more map fragments that map a predetermined amount of data blocks, e.g., approximately 4 MB of data blocks.

Illustratively, the block ID (hash value) may be used to distribute the data blocks among bins in an evenly balanced (distributed) arrangement according to capacity of the SSDs, wherein the balanced arrangement is based on "coupling" between the SSDs, i.e., each node/SSD shares approximately the same number of bins with any other node/SSD that is not in a same failure domain, i.e., protection domain, of the cluster. This is advantageous for rebuilding data in the event of a failure (i.e., rebuilds) so that all SSDs perform approximately the same amount of work (e.g., reading/writing data) to enable fast and efficient rebuild by distributing the work equally among all the SSDs of the storage nodes of the cluster.

In an embodiment, the data is persistently stored in a distributed key-value store, where the block ID of the data block is the key and the compressed data block is the value. This abstraction provides global data deduplication of data blocks in the cluster. Referring again to FIG. 4, the distributed key-value storage may be embodied as, e.g., a "zookeeper" database 450 configured to provide a distributed, shared-nothing (i.e., no single point of contention and failure) database used to store configuration information that is consistent across all nodes of the cluster. The zookeeper database 450 is further employed to store a mapping between an ID of each SSD and the bin number of each bin, e.g., SSD ID-bin number. Each SSD has a service/process associated with the zookeeper database 450 that is configured to maintain the mappings in connection with a data structure, e.g., bin assignment table 470. Illustratively the distributed zookeeper is resident on up to, e.g., five (5) selected nodes in the cluster, wherein all other nodes connect to one of the selected nodes to obtain the mapping information. Thus, these selected "zookeeper" nodes have replicated zookeeper database images distributed among different failure domains of nodes in the cluster so that there is no single point of failure of the zookeeper database. In other words, other nodes issue zookeeper requests to their nearest zookeeper database image (zookeeper node) to obtain current mappings, which may then be cached at the nodes to improve access times.

For each data block received and stored in NVRAM 230, the volume services 320a,b compute a corresponding bin number and consult the bin assignment table 470 to identify the two SSDs 270a,b to which the data block is written. At boxes 408a,b, the metadata services 320a,b of the storage nodes 200a,b then issue store requests to asynchronously flush a copy of the compressed data block to the block services 600a,b associated with the identified SSDs. An exemplary store request issued by each volume service 320 and received at each block service 600 may have the following form:

store(block ID,compressed data)

The block service 600a,b for each SSD 270a,b determines if it has previously stored a copy of the data block. If not, the block service 600a,b stores the compressed data block associated with the block ID on the SSD 270a,b. Note that the block storage pool of aggregated SSDs is organized by content of the block ID (rather than when data was written or from where it originated) thereby providing a "content addressable" distributed storage architecture of the cluster. Such a content-addressable architecture facilitates deduplication of data "automatically" at the SSD level (i.e., for "free"), except for at least two copies of each data block stored on at least two SSDs of the cluster. In other words, the distributed storage architecture utilizes a single replication of data with inline deduplication of further copies of the data, i.e., there are at least two copies of data for redundancy purposes in the event of a hardware failure.

Figure 6:
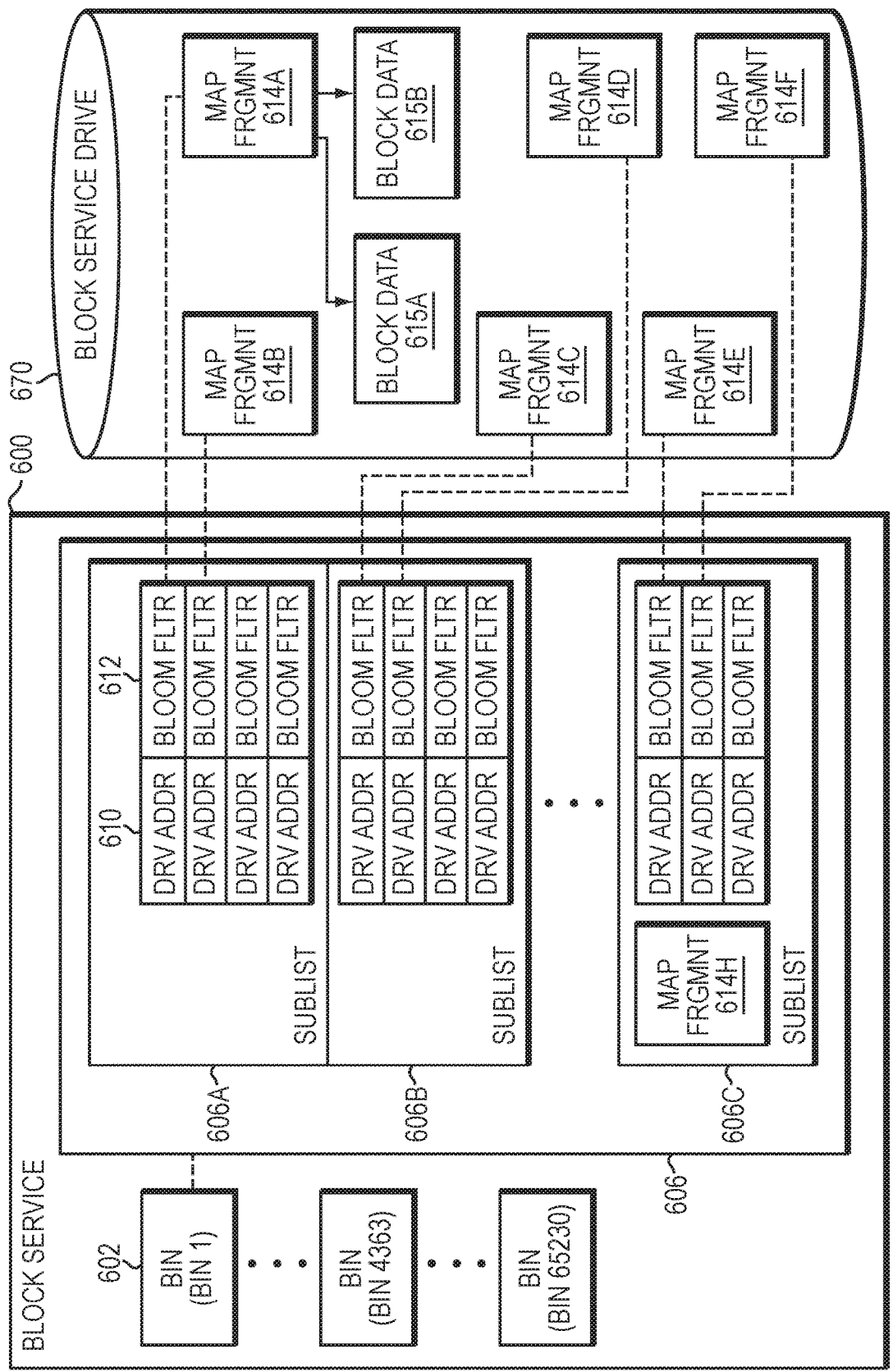
FIG. 6 is a block diagram illustrating details of a block service.

FIG. 6 is a block diagram illustrating details of a block service 600. Bins 602 associated with the block service 600 are illustrated with a bin identifier for the bin in parenthesis (e.g., bin 1, bin 4363, bin 65230). As noted, the block service 600 maintains a mapping between the block ID 506 and the location of the data block 615 on its associated storage device/SSD, i.e., block service drive (BSD) 670, in map fragments 614. In an embodiment, a map fragment 614 may map as many as sixty-four block IDs 506 to their corresponding data block locations or BSD addresses. For example, map fragment 614A may include mappings from block IDs 506 to data blocks 615A and 615B. Illustratively, each bin 602 may include one or more sublists 606 that map the block IDs 506 associated with the bin to data blocks on a BSD 670. A sublist 606 may be located using a sublist identifier masked from the block ID 506. In an embodiment, the sublists 606 may be organized into an in-core sublist search data structure, such as an array, vector, tree (e.g., binary retrieval tree) and the like such that the sublist identifier may be an index into the sublist search data structure used to locate the map fragments. Bin 602 may include a subset of sublists 606, wherein the subset includes sublists 606A, 606B and 606C. As used herein, a sublist will be referred to generically as sublist 606.

Illustratively, the map fragment 614 may be embodied as an "active" map fragment or a "frozen" map fragment. An active map fragment refers to a map fragment that has space available to store a mapping, whereas a frozen map fragment refers to a map fragment that is full, i.e., has no available space for storing a mapping. In order to provide fast and efficient servicing of data in accordance with the storage requests, the map fragments 614 are preferably maintained in memory 220 (in-core) to enable efficient processing of the metadata required to service the data. Moreover, in order to reduce the memory footprint usage of each storage node 200, the active map fragments are preferably maintained in memory as "in-core" map fragment data structures 614H and the frozen map fragments are "paged-out" and stored on the BSD 670 as "on-disk" map fragment structures 614A-F.

When a block ID is generated for a data block destined for storage on BSD 670, the block service 600 examines the sublist field 510 of the block ID 506 to determine the sublist associated with the data block. The block ID is then loaded into an in-core active map fragment 614H for that sublist as part of a mapping that includes the storage location of the data block on the BSD 670. As the active map fragment is populated, a filter, e.g., a Bloom filter 612, is generated that identifies all the data blocks stored on the BSD 670 that are mapped by the map fragment 614H. To that end, each sublist 606 may further include one or more bloom filters 612, each having an associated BSD drive address (dry addr) 610 used to locate an on-disk map fragment structure 614A-F for the filter, if needed. Illustratively, a Bloom filter 612 may be embodied as a data structure, e.g., an array of bits, and a set of hash functions that can be used to test whether an element is a member of a set. A Bloom filter and its associated algorithms may be configured so that false positive matches are possible, but false negatives are not. Thus, a query on a Bloom filter 612 can return a result that indicates that the item that is the subject of the query (e.g., a block ID) is either possibly in the set of mappings for a map fragment 614, or definitely not in the set of mappings. Additionally, Bloom filters can be organized according to the search data structure, and can have an identifier for the sublist that created the Bloom filter such that the sublist identifier may be used to index into the search data structure to obtain the Bloom filters associated with the map fragment 614. That is, the sublist identifier may be used to retrieve Bloom filters from the search data structure that identify the map fragments. In an embodiment, the search data structure may include nodes having the Bloom filters and the associated map fragments. Further, a map fragment 614 may include a sublist identifier 510 corresponding to the sublist 606 that is associated with the map fragment 614. These identifiers can be used to recreate the sublists in the event of a system restart.

Upon being fully populated, the in-core active map fragment 614H transitions to frozen map fragment that is stored (persisted) on the BSD as metadata embodied as an on-disk map fragment structure, e.g., map fragment 614E, F. As part of the transition, additional metadata embodied as a map fragment filter (MFF) of the generated Bloom filters is created that includes a location (e.g., a pointer) referencing the frozen map fragment structure to be stored on the BSD. The block service 600 then writes (pages-out) the frozen map fragment and MFF to the BSD, wherein the MFF includes the Bloom filter 612 and pointer to the on-disk location (i.e., BSD address 610) of the frozen map fragment.

Figure 7:
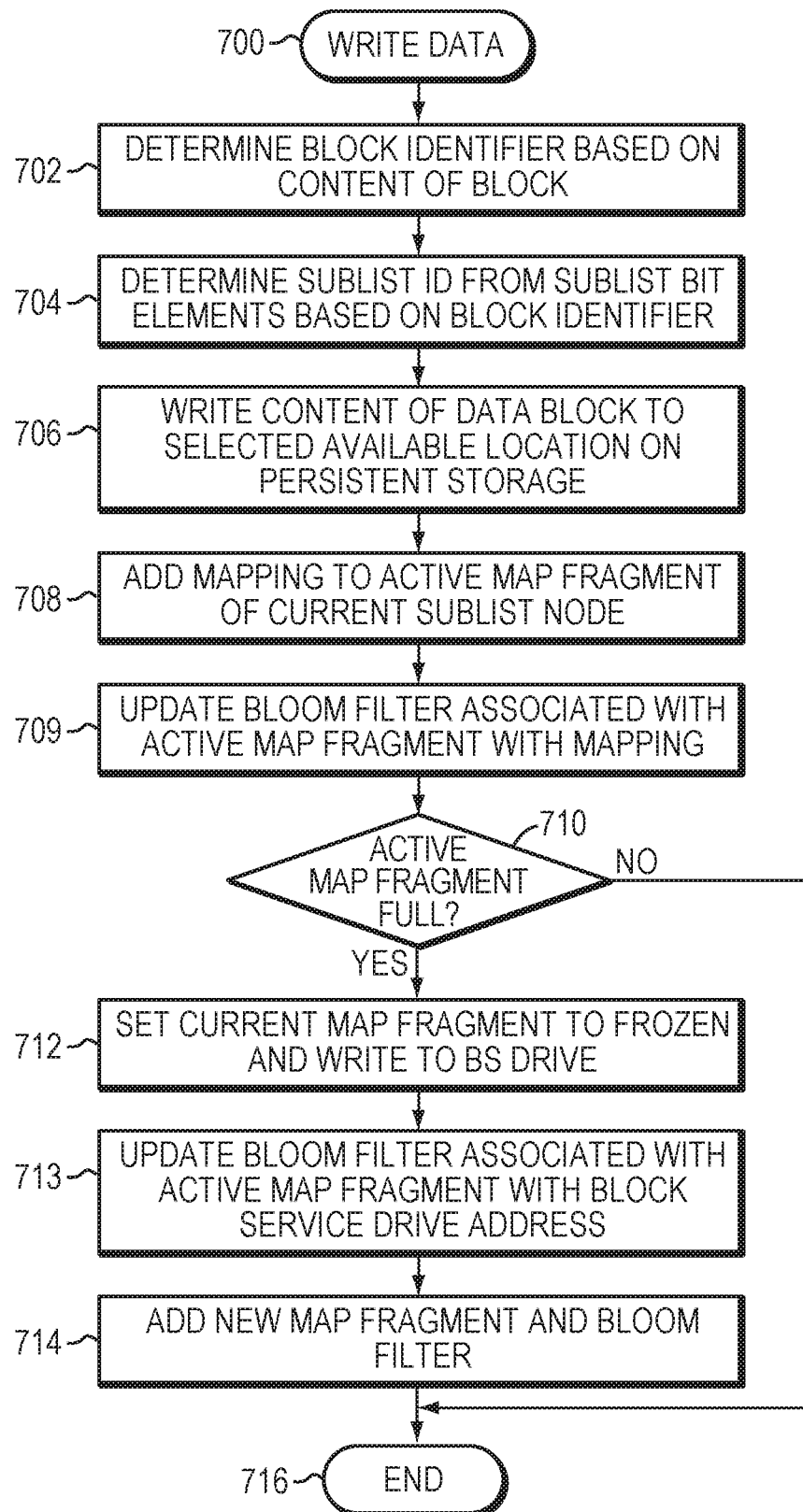
FIG. 7 is a flowchart illustrating operations of a method for writing data in the storage service.

FIG. 7 is a flowchart illustrating operations of a method for writing data (block 700) in storage service 300. At block 702, the block service determines a block ID for the data. As discussed above, the block ID may be a hash of the data block to be written to the BSD. At block 704, a sublist identifier is determined based on the sublist mask of bits in the block ID. The sublist identifier is used to locate the desired sublist using the sublist search data structure. An available location for the data on the BSD (persistent storage) is selected and, at block 706, the data is written to the BSD. At block 708, a mapping from the block ID to the location on the BSD is created and added to the active map fragment. At block 709, a Bloom filter associated with the map fragment is updated to indicate that a mapping for the block identifier is contained within the map fragment. At decision block 710, a check is made to determine if the addition of the mapping at block 708 has caused the active map fragment to become full. If the active map fragment is not yet full, then the method ends at block 716. If the active map fragment is full, then at bock 712, a state of the active map fragment is changed from active to frozen, and the map fragment is written (paged-out) to the BSD. At block 713, the BSD address associated with the Bloom filter for the map fragment is updated to indicate the BSD address. Note that, in an embodiment, the Bloom filters are illustratively maintained in-core (in memory) to eliminate read operations (and associated read amplification) required to retrieve the filters from the BSD, while ensuring fast and efficient access to the metadata of the filters needed to locate data blocks. At block 714, a new map fragment and associated Bloom filter are added to the sublist. The method then ends at block 716.

Figure 8:
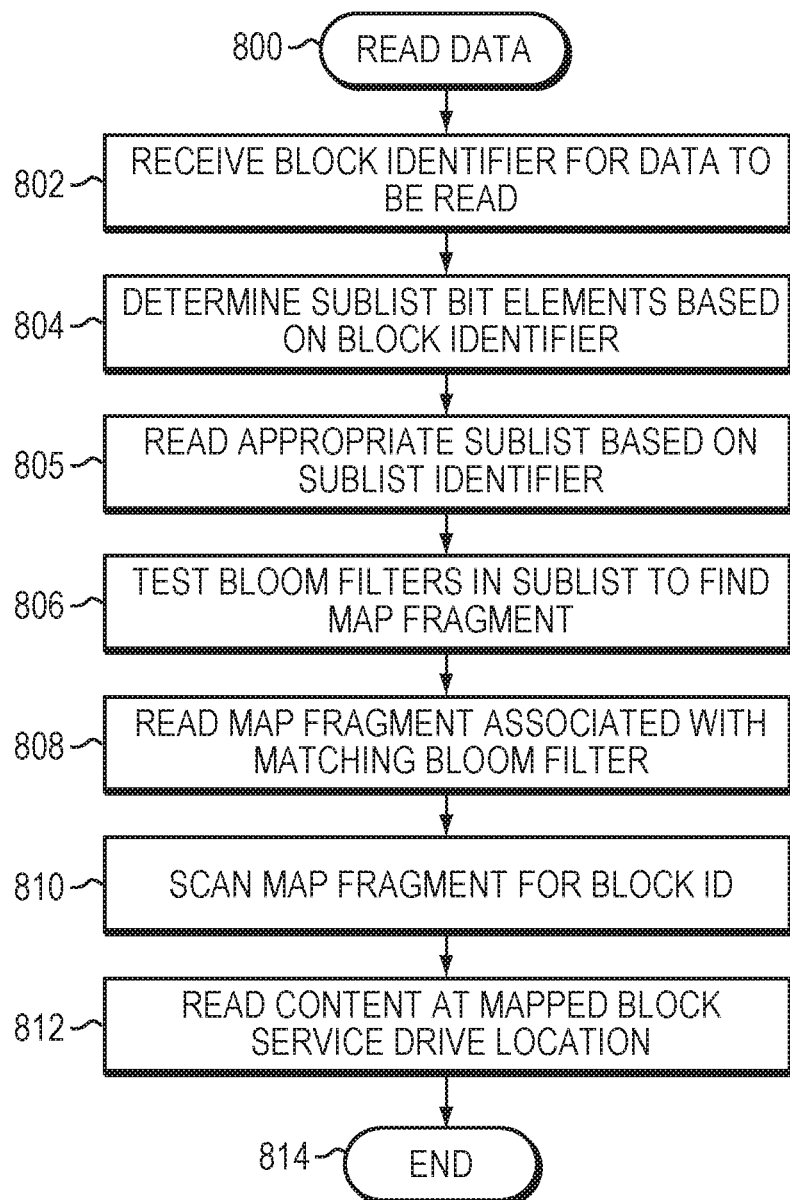
FIG. 8 is a flowchart illustrating operations of a method for reading data in the storage service.

FIG. 8 is a flowchart illustrating operations of a method for reading data (block 800) in storage service 300. At block 802, a block ID for the desired block of data to be read is received. At block 804, a bin identifier and sublist identifier can be determined based on the block ID and the appropriate block service can be used to obtain the data. At block 805, the block service locates (reads) the appropriate sublist based on the sublist identifier. At block 806, the block service then tests the Bloom filters in the sublist to determine which Bloom filter may be associated with a map fragment having the desired block identifier. At block 808, the (frozen) map fragment associated with the matching Bloom filter is read (paged-in) from the BSD. Note that due to the false positive possibility of Bloom filters, subsequent reads of map fragments from the BSD may be needed from Bloom filters indicating a positive match (i.e., false positive). At block 810, the map fragment is scanned for the desired block ID. At block 812, the block service reads the desired data from the BSD using the BSD location indicated in the mapping from the block ID to BSD location. The method then ends at block 814.

As storage nodes 200 are added to the cluster 100, or as larger storage devices are added, the amount of data managed (serviced) by the storage nodes increases. As more data is serviced by the storage nodes, more data blocks are generated which, in turn, require generation of more metadata, i.e., map fragments 614 for each sublist 606 and associated Bloom filters. However, sublist identifiers are initially configured for a particular number of bits in the sublist field 510 of the block ID 506. If the number of bits used for a sublist identifier remains constant, each sublist must map a larger amount of data. Eventually, each sublist 606 may reach a point where the map fragments 614 may exceed the desired mapping of the predetermined amount (e.g., 4 MB) of data blocks. It may be desirable for network data transfer considerations and storage device efficiency to arrange sublists so that each sublist maps approximately 4 MB of data, e.g., a sublist mapping size of 4 MB. Increasing the amount of data mapped via a sublist 606 when storage nodes 200 are added or when larger storage devices are used can cause the sublist to expand beyond mapping 4 MB of data, leading to potential inefficiencies. For example, exceeding the predetermined amount of data blocks per sublist 606 may increase the need for additional Bloom filters 612, e.g., in the form of multiple levels of Bloom filters, resulting in corresponding increasing high false positive rates. Each Bloom filter has an associated false positive probability that is based on the size of the bloom filter; thus, increasing the number of Bloom filters 612 also increases the chance for false positives. A false positive typically results in unnecessary reads to the storage device when the data is not actually mapped to the map fragment that is the subject of the false positive. As a result, a trade-off occurs between sublist mapping size vs. average additional reads incurred due to Bloom filter false positives for a given map fragment fullness (i.e., number of used entries). Therefore, a targeted sublist data mapping size of 4 MB is desirable, as indicated in the above embodiment.

Accordingly, another bit of the sublist field 510 may be allocated to limit the mapping of the sublist (and associated map fragments) to the predetermined amount of data blocks. That is, when the sublist is "full" (e.g., the predetermined number of data blocks associated with the sublist is exceed), then additional bits may used. For example, the number of bits used in the sublist field 510, e.g., to mask sublist identifiers, may increase from 2 to 3 bits (i.e., from 4 sublists to 8 sublists), resulting in 4 new sublists 606 per bin 602. The number of bits used to mask the sublist identifiers can be increased while the cluster is still in operation. Block IDs 506 of data blocks for new write requests may be written to the new sublists, whereas block IDs of data blocks stored in previously written sublists may be maintained and eventually combined with the new sublists based on shared predefined bits, e.g., least significant bits (LSBs), of the sublist field 510. That is, block IDs of data blocks maintained in previous sublists identified by 2 bits (e.g., 00) may be eventually combined with new sublists identified by 3 bits (e.g., 000 and/or 100) based on the shared LSBs (e.g., 00). A "history" of the previously written map fragments persisted on-disk may be maintained for a period of time (e.g., until garbage collected and/or re-cycled) in accordance with a log-structured file system disposed over the BSD, thereby obviating the need to rehash to increase the number of sublists by re-writing metadata, i.e., the previously persisted map fragments, and incurring associated increased write amplification.

Figure 9:
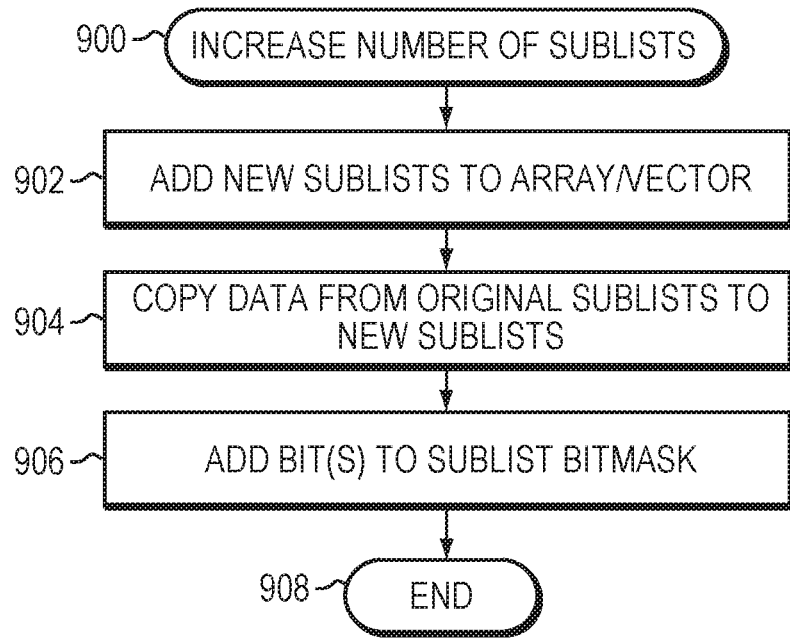
FIG. 9 is a flowchart illustrating operations of a method for increasing the number of sublists.

FIG. 9 is a flowchart illustrating operations of a method for increasing the number of sublists (block 900). At block 902, sublists are added to a sublist array or sublist vector. The number of sublists to be added corresponds to the number of bits of the sublist field to be added to the sublist mask. For example, an increase in the sublist identifier mask of one bit will result in twice the original number of sublists. At block 904, data from the original sublists is copied to the new sublists. For example, if one bit is added to the sublist mask, then the number of sublists doubles. Further to the above example, assume that two bits are used as a sublist mask, and that one bit is to be added to the sublist mask. In this instance, the map fragments and Bloom filters in a sublist identified by the two bits, e.g., 01*b*, will still exist in the sublist identified by three bits, e.g., 001*b*. Additionally, the sublist metadata for sublist 01*b* may also be copied to the sublist identified by the three bits 101*b*. In an embodiment, the sublist metadata can include pointers (e.g., on-disk locations) to map fragments and Bloom filters. Thus, copying the sublist metadata to a new sublist may be effected by copying pointers referencing the same map fragments and Bloom filters of the original sublist. As a result, the original sublist identified as 01*b* points to (i.e., references) the same map fragments as sublists 001*b* and 101*b*. This is desirable because metadata may be persisted using the original sublist mask size. Copying the metadata allows backward compatibility with previous sublist mask sizes. As the cluster continues to operate, the sublists using the original mask size will be overwritten using the new mask size as new data is provided to and serviced by the storage service. Adding the new sublists can keep the desired 4 MB per sublist size in place. At block 906, the sublist mask size is adjusted to reflect the new number of bits to be used to mask a sublist identifier from a block identifier. The method then ends at block 908.

Figure 10:
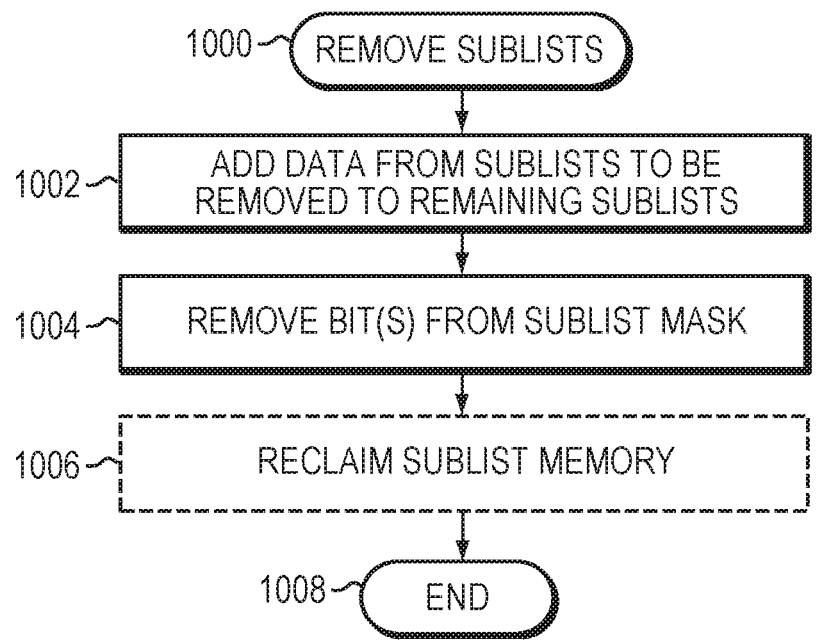
FIG. 10 is a flowchart illustrating operations of a method for decreasing the number of sublists.

FIG. 10 is a flowchart illustrating operations of a method for decreasing the number of sublists (block 1000). Just as it can be desirable to increase the number of sublists, it can also be desirable to shrink the number of sublists. For example, if storage nodes are removed or storage devices are removed from the cluster (i.e., storage capacity of the cluster is decreased), it may be desirable to decrease the number of sublists. Shrinking the number of sublists can help reduce memory footprint usage and requirements. At block 1002, map fragment pointers and Bloom filter pointers can be copied from sublists that are to be removed. As a greatly simplified example, assume that two bits of the sublist field are used to mask the sublist identifier, and that one bit is to be removed from the mask. In this case, the sublist metadata from sublist 11*b* can be added to sublist 1*b*, and the sublist metadata from sublist 10*b* can be added to sublist 0*b*. At block 1004, the sublist mask is updated to remove bit(s) of the sublist field from the sublist mask. At block 1006, memory (e.g., BSD storage space) associated with sublists that are no longer used (and their associated map fragments and Bloom filters) can optionally be reclaimed as the cluster continues to operate and writes of new data to the storage devices use the new sublist mask. For log structured writes of a circular log, the memory can be reclaimed when the log (e.g., storage device) has been lapped. The method then ends at block 1008.

Logging and Update of Metadata in Log-Structured File System

In an embodiment, the log-structured file system (LSFS) is disposed over the BSD 670 to enable writing or logging of data (and metadata) blocks as logical chunks or "segments" on the drive. The segments are illustratively sized up to, e.g., 1 MB for the block services (BS) and 4 MB for the volume services (VS), and contained within fixed sized segment files or logs of the BSD to facilitate indexing among the segments of the log.

Figure 11:
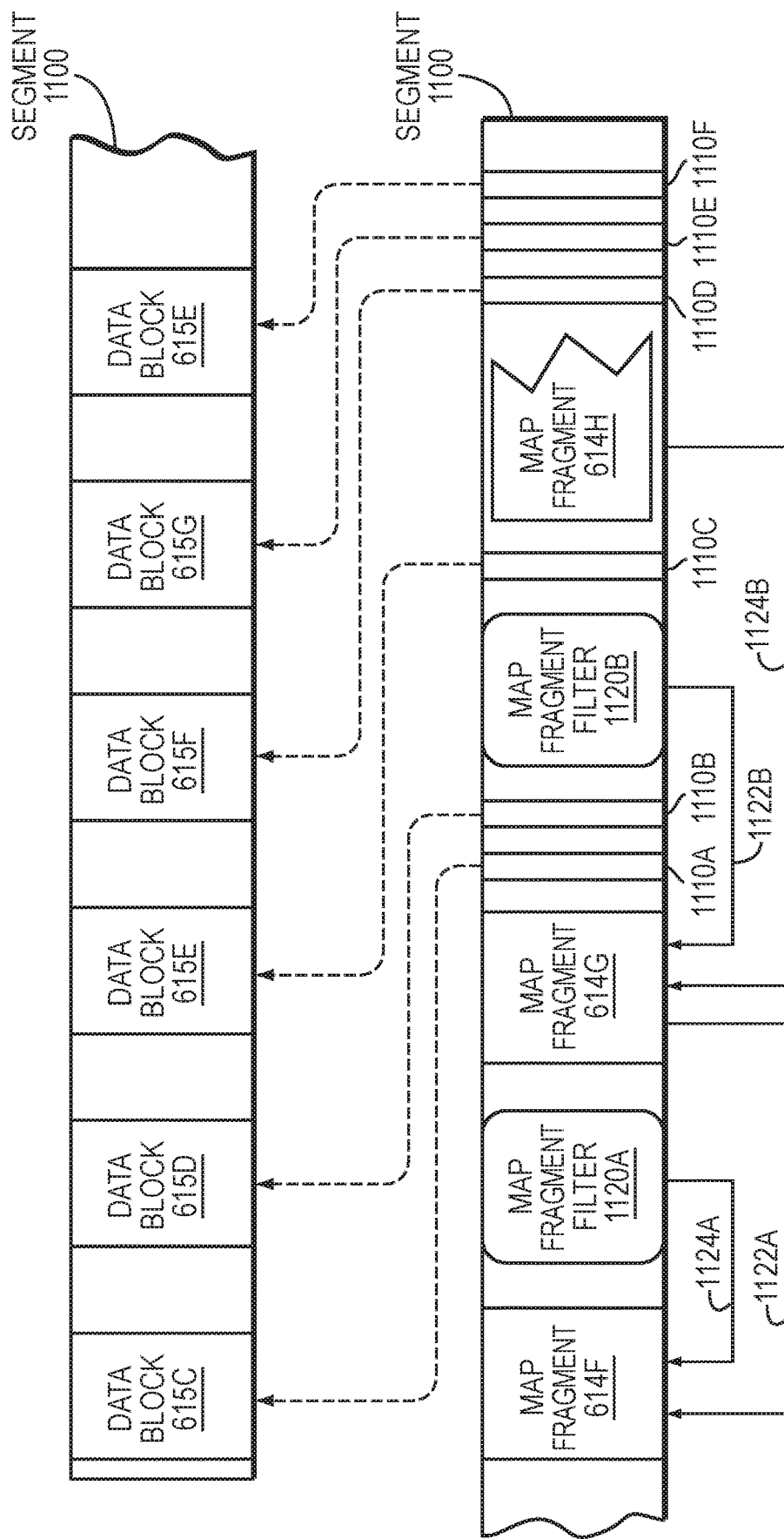
FIG. 11 is a block diagram of a log of a block services drive.

FIG. 11 is a block diagram of the log (i.e., on a segment) of the BSD. Each new frozen map segment 614F,G written to the segment 1100 maintains a pointer 1124A,B to (e.g., a location referencing) a last written frozen map 614F-H to form a chain (e.g., linked-list) of on-disk map fragments 614A-F as well as the MFF 1120A. In addition, each time a data block is persisted (written) on a segment 1100 of the BSD, an active map fragment 614H is populated in-core and a metadata write marker 1110A-F is recorded (logged) on the segment (on-disk) 1100 indicating the location of the data block 615 that was written to the segment 1100. If a storage node crashes when the active map fragment is only partially populated, the metadata write markers facilitate rebuild of the active map fragment upon recovery and restart of a storage service of the node.

Illustratively where writes to storage devices, such as SSDs, are performed in a log structured manner, the use of Bloom filters, map fragments and sublists as described herein can reduce the time required for a storage service restart. The SSD (BSD) locations of a previously stored (frozen) Bloom filter can be stored along with a new map fragment and Bloom filter as MFF links or pointers 1122A,B and 1124A,B respectively to (i.e., reference) the previously stored frozen map fragments 614F,G and Bloom filter fragments. In response to a failure or crash of a storage node, during restart the Bloom filters and frozen map fragments can then be traversed as a linked list (i.e., traverse the pointers 1122 and 1124) by, e.g., starting at the end of the log and reading backwards. The sublist identifiers in the Bloom filters and the frozen map fragments can be used to rebuild the identified sublists as the Bloom filters and sublists are traversed. Upon encountering a last (completely) written frozen map fragment 614G, any partially written map fragments 614H as well as unstored active map fragments resident in-core at the time of the crash can be identified by the metadata write markers 1110E,D that correspond to the partially written map fragment and the active map fragment being populated (i.e., in-progress) in-core at the time of the failure. That is, metadata write markers written after (i.e., later in time than) the last complete frozen map fragment correspond to any partially written (i.e., incomplete) map fragment as well as any as yet unwritten active map fragment at the time of the crash. As such, the incomplete or partially written map fragment may be ignored. Illustratively, the metadata write markers may include a timestamp or monotonically increasing identifier value with each new metadata write marker written on-disk. The metadata write markers may then be replayed (re-generated) to enable rebuild of the active map fragments and associated sublists. Once all of the sublists have been rebuilt, the restart process can be complete with respect to rebuilding the metadata. It is not necessary to continue reading the rest of the BSD to generate metadata. This can provide an advantage over many conventional systems in which the entire SSD (BSD) must be read in order to rebuild the related metadata.

Advantageously, the technique described herein provides low memory footprint usage without increased write amplification due to rehashing, while minimizing the number of read operations associated with additional boom filters in order to locate data on the storage devices (BSDs). The technique achieves these advantages by optionally paging-out frozen map fragments (block IDs) from memory to BSDs and only maintaining a small portion of the block IDs (i.e., active map fragments) in-core. By obviating the need to rehash and re-write metadata associated with previously persisted frozen map fragments, the technique minimizes write amplification. In addition, by eliminating additional (i.e., multiple levels of) Bloom filters that need to be examined (as well as the need for corresponding read operations) to locate data blocks, the technique reduces the likelihood of false positive rates. Essentially, the technique achieves the above advantages through the use of sublists and masking of sublist field bits, which may be resizable to limit the false positive rates and obviate rewriting of persisted metadata mappings.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for recovery of metadata stored by a storage service having persistent storage, the method comprising:
    reading a filter from the persistent storage, the filter associating a map fragment and a first block identifier (block ID) of a first data block on the persistent storage;
    loading the map fragment from the persistent storage using the filter, the map fragment including a mapping of the first block ID to the map fragment associated with a first sublist, wherein the first sublist is based on a field of the first block ID; and
    reconstructing a first part of a search data structure from the first sublist such that the map fragment is indexed by the first sublist into the search data structure.

2. The method of claim 1, wherein the filter is a Bloom filter.

3. The method of claim 1, further comprising:
    replaying a metadata write marker written to the persistent storage, the metadata write marker including a mapping of a second block ID to a second data block on the persistent storage, wherein a second sublist is based on the field of the second block ID;
    rebuilding an active map fragment associated with the second sublist;
    reconstructing a second part of the search data structure from the second sublist such that the active map fragment is indexed by the second sublist into the search data structure.

4. The method of claim 1, further comprising starting at an end of a log to read the filter from the persistent storage.

5. The method of claim 4 wherein the log is traversed backwards.

6. The method of claim 1 further comprising traversing remaining filters from the persistent storage as a linked list to rebuild associations of the first sublist.

7. The method of claim 1 further comprising ignoring a partially written map fragment on the persistent storage.

8. The method of claim 1 wherein the search data structure is a binary retrieval tree.

9. The method of claim 1 further comprising reconstructing a remaining portion of the search data structure by traversing remaining filters and remaining map fragments from the persistent storage.

10. The method of claim 1 wherein the first data block, the filter and the map fragment are stored on a segment of the persistent storage.

11. A system comprising:
    a storage node coupled to one or more storage devices;

a memory coupled to a processor of the storage node executing a storage service to recover metadata, the storage service configured to:
- read a filter from the persistent storage, the filter associating a map fragment and a first block identifier (block ID) of a first data block on the persistent storage;
- load the map fragment from the persistent storage using the filter, the map fragment including a mapping of the first block ID to the map fragment associated with a first sublist, wherein the first sublist is based on a field of the first block ID; and
- reconstruct a first part of a search data structure from the first sublist such that the map fragment is indexed by the first sublist into the search data structure.

12. The system of claim 11 wherein the filter is a Bloom filter.

13. The system of claim 11 wherein the storage service is further configured to:
- replay a metadata write marker written to the persistent storage, the metadata write maker including a mapping of a second block ID to a second data block on the persistent storage, wherein a second sublist is based on the field of the second block ID;
- rebuild an active map fragment associated with the second sublist; and
- reconstruct a second part of the search data structure from the second sublist such that the active map fragment is indexed by the second sublist into the search data structure.

14. The system of claim 11 wherein the storage service is further configured to start at an end of a log to read the filter from the persistent storage.

15. A non-transitory computer readable medium containing executable program instructions for execution by a storage service having persistent storage recovery of metadata, comprising:
- reading a filter from the persistent storage, the filter associating a map fragment and a first block identifier (block ID) of a first storage block on the persistent storage;
- loading the map fragment from the persistent storage using the filter, the map fragment including a mapping of the first block ID to the map fragment associated with a first sublist, wherein the first sublist is based on a field of the first block ID; and
- reconstructing a first part of a search data structure from the first sublist such that the map fragment is indexed by the first sublist into the search data structure.

16. The system of claim 11 wherein the storage service is further configured to traverse remaining filters from the persistent storage as a linked list to rebuild associations of the first sublist.

17. The system of claim 11 wherein the storage service is further configured to ignore a partially written map fragment on the persistent storage.

18. The system of claim 11 wherein the search data structure is a binary retrieval tree.

19. The system of claim 11 wherein the storage service is further configured to reconstruct a remaining portion of the search data structure by traversing remaining filters and remaining map fragments from the persistent storage.

20. The system of claim 14 wherein the log is traversed backwards.

* * * * *